US009326447B2

(12) United States Patent
Hovenga et al.

(10) Patent No.: US 9,326,447 B2
(45) Date of Patent: May 3, 2016

(54) AIR INTAKE SYSTEM FOR COOLING AIR

(71) Applicant: CLAAS SELBSTFAHRENDE ERNTEMASCHINEN GMBH, Harsewinkel (DE)

(72) Inventors: Frank Hovenga, Muenster (DE); Andreas Alterbaum, Bad Iburg (DE); Bjoern Waten, Nottuln (DE); Maik Prangemeier, Oelde (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 146 days.

(21) Appl. No.: 14/148,126

(22) Filed: Jan. 6, 2014

(65) Prior Publication Data
US 2014/0190140 A1 Jul. 10, 2014

(30) Foreign Application Priority Data

Jan. 10, 2013 (DE) .......................... 10 2013 100 202

(51) Int. Cl.
*A01D 75/00* (2006.01)
*A01D 41/12* (2006.01)
*F01P 11/10* (2006.01)
*F01P 11/12* (2006.01)
*A01B 71/08* (2006.01)

(52) U.S. Cl.
CPC ............. *A01D 75/00* (2013.01); *A01D 41/1252* (2013.01); *F01P 11/10* (2013.01); *F01P 11/12* (2013.01); *A01B 71/08* (2013.01)

(58) Field of Classification Search
CPC ........... F01P 11/06; F01P 11/10; F01P 11/12; A01B 71/08; B60R 19/52; B60R 19/54; B60K 13/02; B60K 11/06; B60K 11/08; B60K 11/085; A01D 75/00; A01D 41/1252

USPC .................. 180/68.1, 68.2, 68.3, 68.4, 68.6; 55/295, 296, 297, 300, 301, 304, 288, 55/289
See application file for complete search history.

(56) References Cited

U.S. PATENT DOCUMENTS

| 4,439,218 | A | * | 3/1984 | Priepke | B01D 46/10 55/282.4 |
| 5,183,487 | A | | 2/1993 | Lodico et al. | |
| 5,466,189 | A | * | 11/1995 | Deutsch | F01P 11/12 460/100 |

(Continued)

FOREIGN PATENT DOCUMENTS

EP  0 566 981  10/1993

*Primary Examiner* — John Walters
(74) *Attorney, Agent, or Firm* — Michael J. Striker

(57) ABSTRACT

An air intake system supplies cooling air to at least one heat exchanger and includes a sieve through which the cooling air flows. The air intake system is equipped on the inlet side with a device for removing and shredding components of the cooling air adhering on the inlet-side surface of the sieve. The device is formed with a suction device and a cutting device. The cutting device is formed of comb-like elements on a surface of the sieve and on a surface section of the suction device facing the surface of the sieve. The comb-like elements disposed on the surface of the sieve are designed as knives disposed on support or knife strips oriented transversely thereto. These support or knife strips extend with separations therebetween. At least one of the support strips is equipped with first knives, the knife-edges of which implement a pulling cut, while the comb-like elements on both end faces of the suction device or of the front element attached thereto are designed as second knives, knife-edges of which implement a pulling cut.

15 Claims, 3 Drawing Sheets

(56) References Cited

U.S. PATENT DOCUMENTS 5,735,337 A * 4/1998 Edwards .................. A01G 3/08
165/119
8,097,050 B2 * 1/2012 Johnson ............. B01D 46/0065
460/102
2012/0279525 A1 * 11/2012 Stone ...................... F28G 1/166
134/34

* cited by examiner

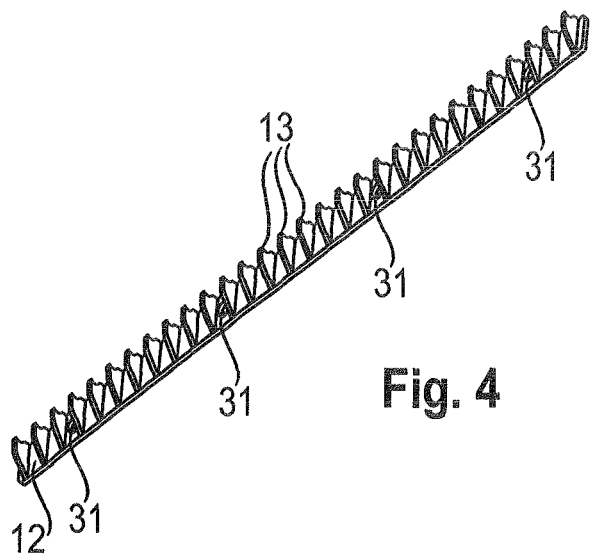
Fig. 4
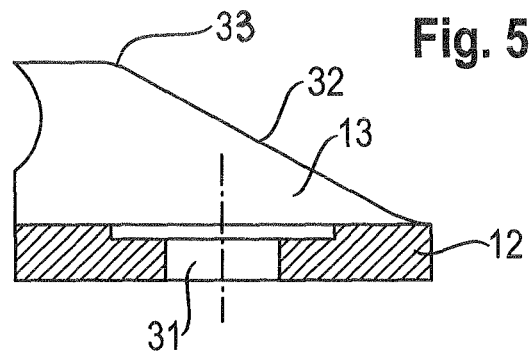
Fig. 5
Fig. 6
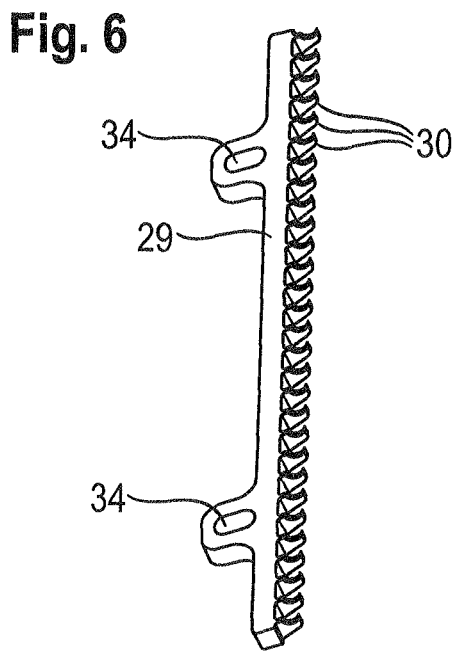
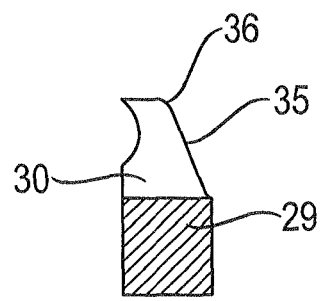
Fig. 7

AIR INTAKE SYSTEM FOR COOLING AIR

CROSS-REFERENCE TO A RELATED APPLICATION

The invention described and claimed hereinbelow is also described in German Priority Document DE 10 2013 100202.1, filed on Jan. 10, 2013. The German Priority Document, the subject matter of which is incorporated herein by reference, provides the basis for a claim of priority of invention under 35 U.S.C. 119(a)-(d).

BACKGROUND OF THE INVENTION

The invention relates to an air intake system for cooling air, which is fed to at least one heat exchanger and/or cooling surfaces of assemblies of a self-propelled harvesting machine. The inventive air intake system comprises a sieve through which the cooling air flows and which is equipped, on the inlet side, with a device for removing and shredding components of the cooling air adhering to the inlet-side surface of the sieve. The device comprises a suction device and a cutting device. The cutting device is formed of comb-like elements on the surface of the sieve and on a surface section of the suction device facing the surface of the sieve, or is formed of a front element connected to the surface section of the suction device.

Self-propelled harvesting machines according to the aforementioned type can be designed as forage harvesters or as combine harvesters. In the case of a self-propelled forage harvester, a stalked crop or corn is picked up via a front attachment, is then fed to a preparation device comprising compression rollers, a chopping assembly and post-chopping devices and, finally is fed via a discharge accelerator and a swivellable upper discharge chute to a collecting vehicle. An adjustable flap disposed at the end of the upper discharge chute and the mobility of the upper discharge chute are used to direct the crop emerging therefrom such that this crop reaches the collecting vehicle and such that this collecting vehicle can be completely filled.

In the case of a self-propelled combine harvester, the crop also is picked up via a front harvesting attachment from which this crop is fed via a feed rake to a preparation device designed as a threshing mechanism and separating devices. Harvested wheat, rapeseed or corn kernels proceed from this preparation device into a grain tank, while the straw, corn stalks, and other components not intended to be harvested are deposited on the field. In order to harvest corn, the front harvesting attachment designed as a wheat and rapeseed header is replaced by a front harvesting attachment designed as a corn picker.

The aforementioned self-propelled harvesting machines are driven by an internal combustion engine, which is preferably disposed in the rear region thereof and is enclosed by covering parts. Typically, this is a water-cooled internal combustion engine comprising a heat exchanger designed as a radiator, through which coolant from a cooling circuit of the internal combustion engine and air surrounding the harvesting machine flow. In addition, oil coolers for a hydraulic system of the harvesting machine, charge air coolers, further assemblies, etc., can be disposed within this covering of the self-propelled harvesting machine. Moreover, air previously cleaned via an air filter and drawn in via an exhaust gas turbocharger for the combustion process of the internal combustion engine also can be drawn in within this region covered by covering parts. A sufficient quantity of air must always be available, of course, for the cooling of the related heat exchanger and for the combustion process.

During a harvesting process, however, the air surrounding the harvesting machine is highly contaminated. In the case of a wheat or rapeseed harvest, these contaminants comprise a large portion of dust, portions of short straw, etc. If the self-propelled combine harvester is used to harvest corn, the contaminants in the air can also be, in part, husk leaves that enclose the harvested corn cobs. In the case of self propelled forage harvesters, air contaminants occur that are formed of straw components of the chopped crop and, provided the self-propelled forage harvester is used to harvest corn for silage. These air contaminants also can be complete husk leaves or the components thereof.

Since, as previously explained, the internal combustion engine is disposed in the rear region of the harvesting machine, in the case of a self-propelled combine harvester, the air contaminants occurring in the region of the sieves and a combine-mounted straw chopper can greatly contaminate the air drawn in by the cooling system of the internal combustion engine and by other cooling assemblies. In the case of self-propelled forage harvesters, the air drawn in by the cooling-air blower in the rear region may comprise components of the chopped crop, since the outlet of the swivellable upper discharge chute is also located in this region.

For this reason, a sieve is disposed in the covering parts, which is designed as a wire grating or a perforated plate and filters out a substantial portion of contaminants contained in the air to prevent these contaminants from clogging the downstream lamella of the heat exchanger. The contaminants deposit on the sieve, however, and clog this sieve. Clogging the sieve thereby prevents an adequate amount of cooling air from being supplied to the particular heat exchanger disposed behind the sieve. The supplied quantity of cooling air also can be reduced after relatively short operating intervals in that large leaves, short straw, or other plant components accumulate on the inlet-side surface of the sieve and therefore block the inflow of cooling air. In the case of the corn harvest, the large leaves can be the husk leaves that enclose the corn cobs, which are difficult to remove from the surface of the sieve.

The sieve can be prevented from clogging by providing a suction device on the surface of the sieve on the inlet side, which continuously suctions up the foreign objects adhering to the inlet-side surface. Without such a suction device, it would be necessary for the driver of the self-propelled harvesting machine or a person responsible for the service of the harvesting machine to manually clean the sieve on a regular basis. This work is often not carried out, however, until the coolant temperature, hydraulic oil temperature or other temperatures rise and, therefore, excessively high component temperatures may cause damage to components of the internal combustion engine or the other assemblies. This can result in high costs and a relatively long standstill of the harvesting machine during the harvest.

An air intake system for cooling air of the type set is known from EP 0 566 981 B1. A sieve housing designed in the shape of a circle or pot and having radially extending spokes is disposed within this air intake system, wherein individual sieve fields extend between the spokes. Furthermore, the sieve housing has a central hub and is designed to be rotatable relative to a suction device designed as a radial arm. The purpose of this suction device is to generate a vacuum on the inlet-side surface of the individual sieve fields, which are guided past this sieve housing during rotation thereof to suction the foreign objects off of this surface. In addition, rakes equipped with tines are provided in the region of the spokes, which interact with a second rake. The second rake comprises crenellations and is formed at a leading edge of the suction device. During the cleaning process, the sieve housing is set into rotation by a belt drive, wherein the rakes equipped with tines pass through grooves between the crenellations of the second rake and thereby cut and shred pods, husks, leaves and other plant parts that are retained on the sieve.

SUMMARY OF THE INVENTION

The present invention overcomes the shortcomings of known arts, such as those mentioned above.

To that end, the present invention provides an arrangement for cleaning the surface of the aforementioned sieve, with which large-leaved and long-stalked plant components that adhere can be continuously shredded with a high level of functional reliability such that these can be subsequently captured and carried away in their entireties by the suction device.

This problem is solved in one embodiment comprising an air intake system for cooling air, which is fed to at least one heat exchanger and/or cooling surfaces of assemblies of a self-propelled harvesting machine, wherein the air intake system comprises a sieve through which the cooling air flows and which is equipped, on the inlet side, with a device for removing and shredding components of the cooling air adhering on the inlet-side surface of the sieve. The device comprises a suction device and a cutting device, which is formed of comb-like elements on the surface of the sieve and on a surface section of the suction device facing the surface of the sieve, or is formed of a front element connected to the surface section of the suction device. The comb-like elements disposed on the surface of the sieve are designed as knives, which are disposed on support or knife strips and are oriented transversely thereto. The support or knife strips extend with separation therebetween, wherein at least one of the support strips is equipped with first knives, the knife-edges of which implement a pulling cut, and in that the comb-like elements on both end faces of the suction device or of the front element attached thereto are designed as second knives, the knife-edges of which implement a pulling cut.

The corresponding geometry of the knife-edges of the two knives and the position of the knife-edges relative to the leaves, stalks, etc., results in the maintenance of an angle of cut that is required to achieve favorable cutting behavior. The resultant pulling cut is the opposite of a pushing cut, in which the knife-edge meets the crop to be cut at a right angle, which, in this case, can cause the leaves and stalks to be carried along by the knife-edge of the second knife and to therefore ultimately accumulate in front of the suction device, which therefore cannot receive the leaves and stalks. Since the material adhering to the surface of the sieve is shredded using a reliable process relying on the knife-edges of the two interacting knives, the material can be subsequently removed in its entirety from the suction device by the suction device. In contrast, according to EP 0 566 981 B1, the tines provided on the rake comprise flat sections, provided they are equipped with an installation bore, while the remaining tines have an oval shape. Provided that the contaminants adhering to the sieve fields can even be shredded as a result, these edges are only capable of implementing a pushing cut. The crenellations provided on the edge of the suction device in the single direction of movement of the sieve that is provided have end faces formed at right angles, and so, as the tines pass through the grooves extending between the crenellations, these end faces are not intended to cut up the material adhering to the surface of the sieve fields, but rather are intended to merely convey the material ahead thereof.

In an embodiment of the invention, the first knives provided on the sieve are designed having first knife-edges, which rise relative to a plane of the surface of the sieve from a front end, as viewed in the direction of movement, diagonally in the direction of a back end, i.e., continuously. Due to this angle of inclination of the knife-edge of each individual knife, a pulling cut occurs when the suction device moves relative to the sieve surface, thereby resulting in optimal cutting behavior.

Alternatively, the geometry of the knife-edges of the first knives is designed such that the knife-edge rises from a front end, as viewed in the direction of motion, in a curved, preferably hyperbolic manner. Advantageously, a pulling cut can also be implemented with a knife-edge curved in this manner. In both cases, the knives can extend, from the base thereof in the direction of a peak, forming an acute angle and, can widen from the front end in the direction of the back end, also as viewed in the direction of motion. The knives therefore have the shape of cutting teeth. The result thereof is that the distance between the knives decreases in the direction of motion. In this case, the "direction of motion" is not intended to mean, of course, that the first knives must be moved, but rather that a relative motion takes place between the first and the second knives in this direction.

It can be expedient to allow the first knife-edges to rise at a slant or hyperbolically in both directions of motion up to a peak, provided the sieve and the suction device are moved in two directions of motion relative to one another. Related arrangements, in which motions of this type take place, are explained in the following in association with the advantages set forth with respect to the further claims.

In an embodiment of the invention, the second knives, which are disposed at least indirectly at the suction device and extend from the corresponding component in the direction of the surface of the sieve, comprise second knife-edges. The second knife edges extend from the receptacles thereof diagonally toward the rear, in the direction of motion. In this case as well, an alternative solution is to design the second knife-edges to be curved, preferably hyperbolic. A pulling cut can therefore be implemented with these knives, which extend at least indirectly from the suction device.

In addition, the sieve preferably is designed to be rectangular in shape and accommodated by a sieve frame, wherein the suction device is guided relative to the sieve via a carriage by means of a linear guide. In this manner, the unit comprising the sieve and the sieve frame is substantially adapted to the dimensions of the heat exchanger disposed downstream thereof in the direction of flow of the cooling air, and therefore all the cooling air is guided from the sieve directly into the heat exchanger. A sieve frame having a rectangular shape can be structurally integrated into the coverings of the harvesting machine better than other geometric shapes. The suction device disposed on the carriage extends in the vertical direction across the corresponding dimension of the sieve and extends from a starting point at a first end of the sieve to a turnaround point at another end of the sieve.

The linear guide also can be disposed such that the carriage is moved with the suction device in the vertical direction over the sieve. The carriage is preferably driven by an electric motor or a hydraulic motor, wherein the drive can be reversed at the particular turnaround point. The first knives on the outer support strips are designed as mirror images of one another. In a corresponding manner, the second knives disposed on the end faces of the suction device by means of the second support strips also have profiles that are mirror images of one another. As a result, a pulling cut is implemented in the vertical edge regions of the sieve in one direction of motion in each case, and therefore material that cannot be suctioned up cannot accumulate in these edge regions.

In an embodiment of the invention, the linear guide can be formed by a rail disposed between frame parts of the sieve frame extending parallel to one another and guide rollers, which are rotatably disposed at least indirectly at a housing of the suction device. If the rail is designed as tube in this context, then each of the guide rollers should furthermore be advantageously equipped with a jacket surface adapted to the radius of curvature of the tube. As a result, precise guidance of the suction device relative to the sieve surface is achieved and, therefore the second knives that are disposed on the suction device or on a component fastened thereto pass precisely through the intermediate spaces formed between the first knives. The first knives are affixed on the inlet-side surface of the sieve by a plurality of support strips, which extend parallel to one another and are separated from one another.

Preferably, only the support strips adjacent to the respective ends of the sieve surface that is passed over should be equipped with first knives designed according to the invention, i.e., these knives implement a pulling cut proceeding from the turnaround point, thereby making it possible for the suction device to then receive the material. A support strip disposed behind same in the direction of motion, however, can be equipped with knives that have front-end knife-edges on both sides. Therefore, if a portion of the material is carried along by the second knives of the suction device, this impacts the knives having the end-face knife-edges and is additionally cut or shredded and is ultimately conveyed via these knife-edges into the suction region of the suction device.

Furthermore, a cover plate should be joined to the housing of the suction device, which covers the sieve at the outlet-side surface thereof, opposite the suction device. As a result, a flow of cooling air opposing the suction direction is prevented that would otherwise reduce the suction effect of the suction device. Finally, the suction device is connected via a suction pipe to a suction blower to which a separating device is assigned. The blower in this case is a radial blower, wherein the air containing foreign objects impacts related surfaces, thereby separating out these components.

BRIEF DESCRIPTION OF THE DRAWINGS

Further features and advantages of the invention will become apparent from the description of embodiments that follows, with reference to the attached figures, wherein:

FIG. 4 presents a perspective representation of a knife strip equipped with first knives;

FIG. 5 presents, in an enlarged view, a side view of a first knife with a cross section of the support strip;

FIG. 6 presents a perspective representation of a knife strip equipped with second knives; and FIG. 7 presents a side view of a second knife, with a cross section of the support strip.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
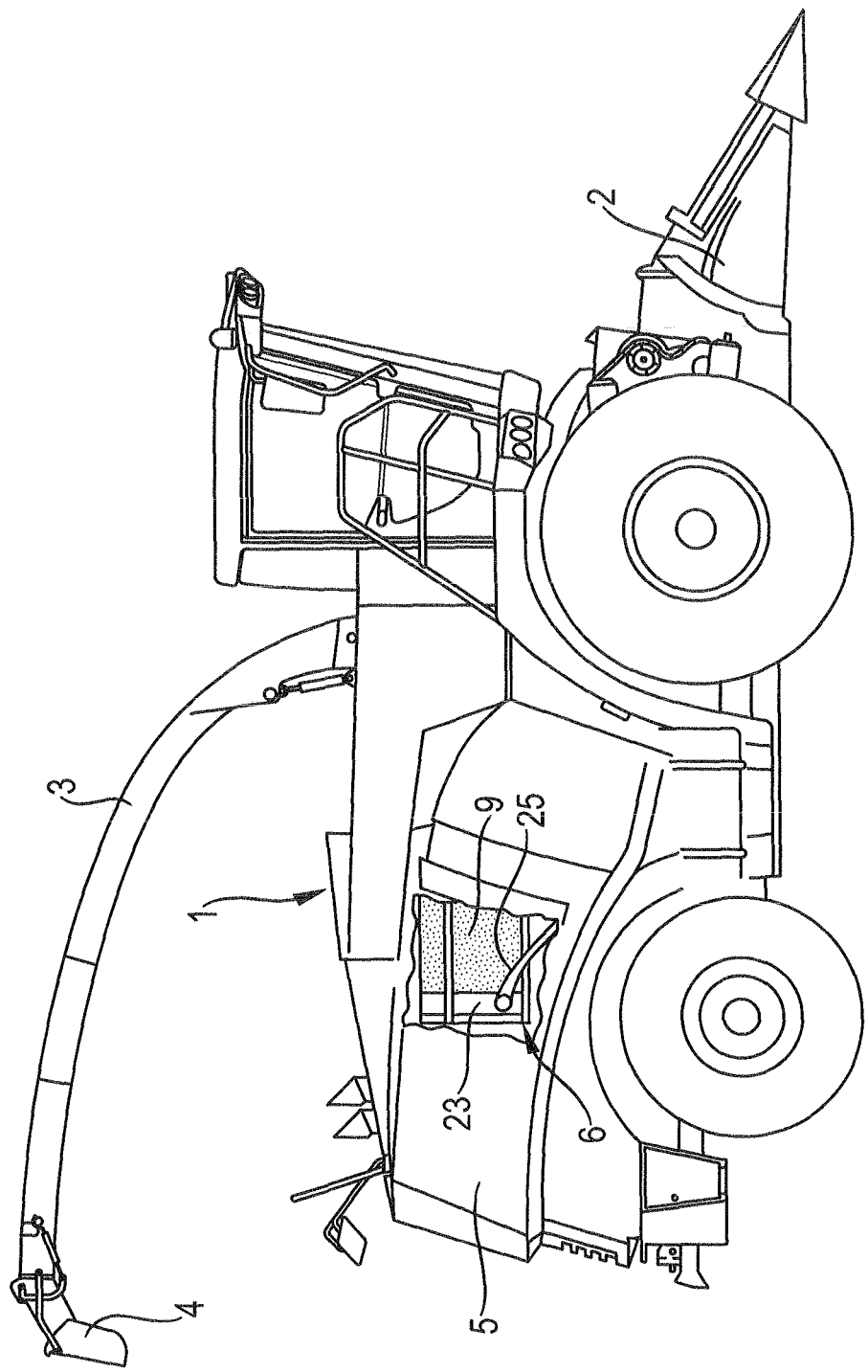
FIG. 1 presents a side view of a harvesting machine designed as a self-propelled forage harvester and a sectional detail view in the region of a sieve disposed in front of a heat exchanger of an internal combustion engine.

FIG. 1 presents a self-propelled harvesting machine 1, which is designed as a forage harvester. The harvesting machine accommodates a front harvesting attachment 2 in the front region thereof, by which the crop is cut, picked up and fed to a non-illustrated chopping and preparation device. The chopped and prepared crop exits this chopping and preparation device with the aid of a discharge accelerator (not shown in FIG. 1) through an adjustable upper discharge chute 3 equipped with a discharge flap. The harvesting machine 1 is equipped with covering elements 5 on both sides, wherein an air intake system 6 assigned to a nonillustrated internal combustion engine is located behind the covering element 5. The air intake system is described in greater detail in the following.

Figure 2:
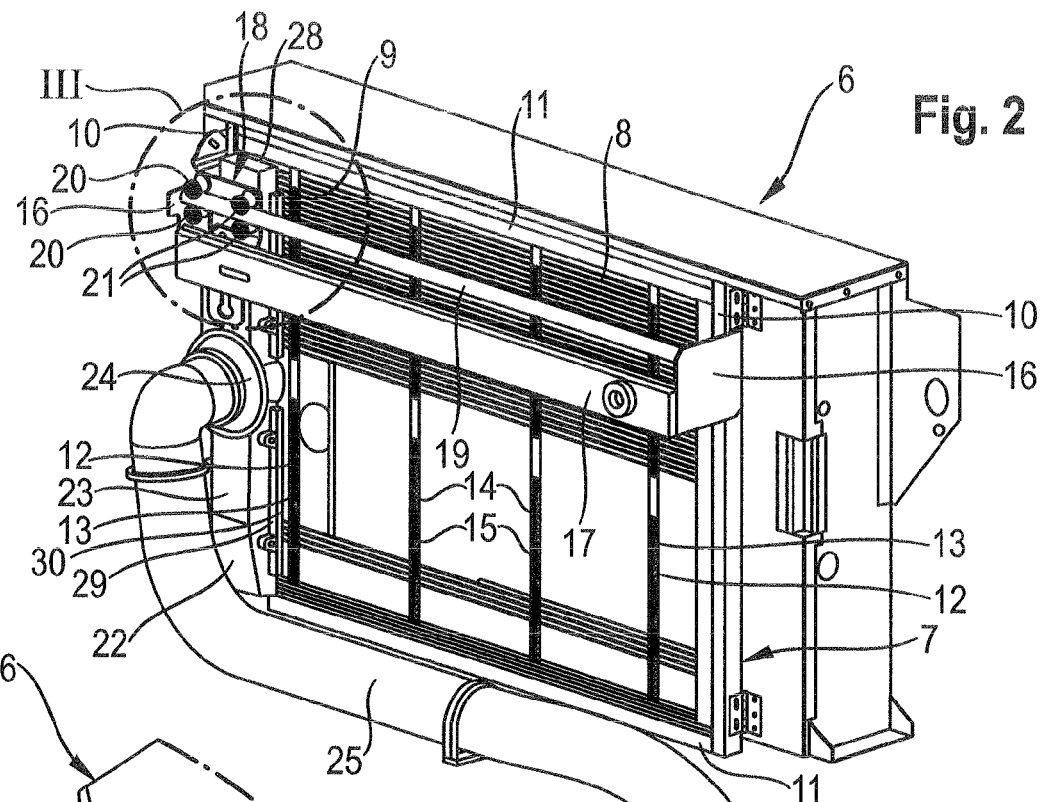
FIG. 2 presents a perspective view of a sieve arrangement located behind the heat exchanger in the direction of flow of the cooling air and is disposed in a radiator housing, and showing a cross section of the sieve.
Figure 3:
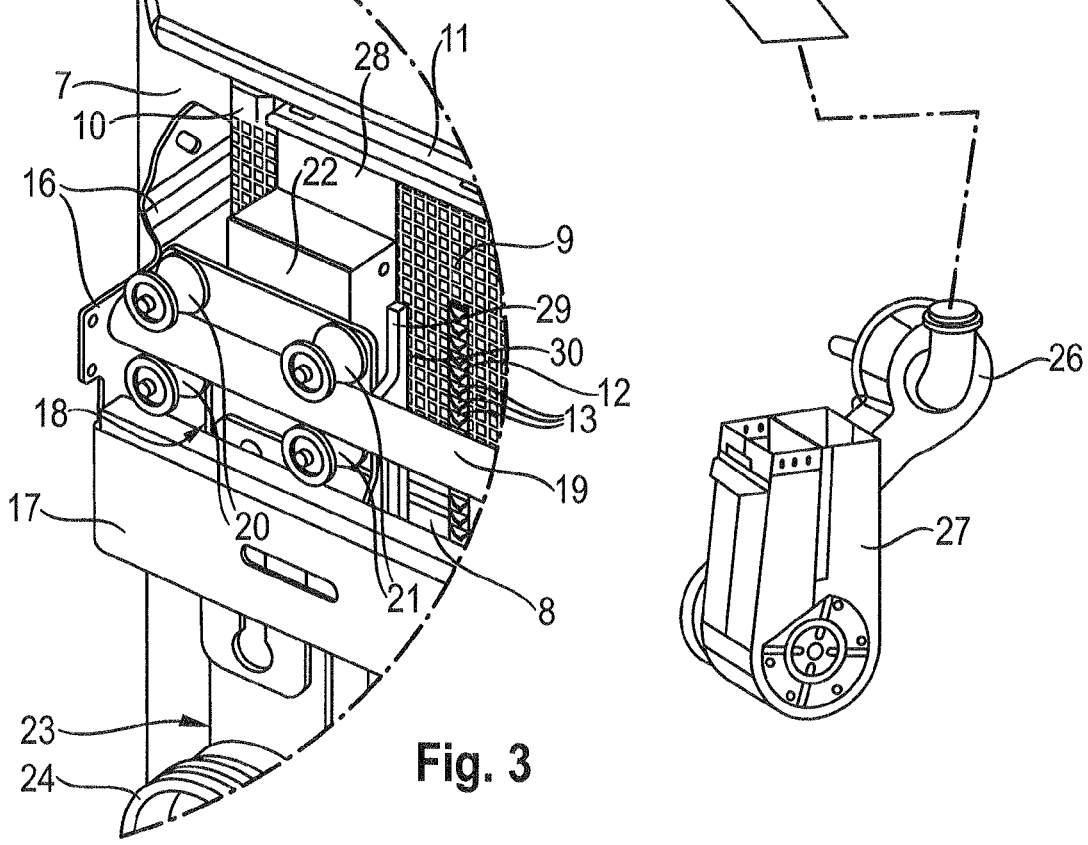
FIG. 3 presents an enlarged view according to section III in FIG. 2, within which a suction device equipped with second knives is represented relative to first knives disposed on support strips also presented in a perspective view.

As shown in FIGS. 2 and 3, the air intake system 6 comprises a heat exchanger 8 disposed in a receiving housing 7. A sieve 9, which is visible only in the left region of the heat exchanger 8, is disposed upstream of this heat exchanger in the direction of flow of the cooling air. The sieve is attached on vertical frame parts 10 and horizontal frame parts 11 of the receiving housing 7. The sieve 9 extends across the entire cooling surface of the heat exchanger 8. The cross section shows the cooling lamella of the heat exchanger 8, in part, which extend behind the sieve 9. Outer support strips 12, which accommodate first knives 13 designed according to the invention and are located in the region of the vertical frame parts 10, are provided on the sieve 9. Two knife strips 14 equipped with knives 15, which have two edges and are oriented in both directions of motion are located in the central region of the sieve 9. In addition, a console 16 is disposed on each of the two vertically extending frame parts 10, wherein these two supports 16 are connected to one another via a cross brace 17. In addition, a tube 19 designed as a rail of a linear guidance system 18 is located between the two supports 16, wherein a housing 22 of a suction device 23 is guided on this tube via roller pairs 20 and 21.

This suction device 23 extends in the vertical direction across a subregion of the sieve 9 and functions in a manner similar to a vacuum cleaner nozzle. The housing 22 of the suction device 23 is connected to a suction blower 26 via a connector 24, via a suction pipe 25, wherein this suction blower leads into a separating device 27. In addition, a cover plate 28 extends from the housing 22 in the upper region thereof, wherein this cover plate covers the sieve 9 on the outlet-side surface thereof in the region of the suction device 23 and is moved together therewith.

As also shown in the enlarged representation according to FIG. 2, a second support strip 29 is disposed at the housing 22 of the suction device 23, which accommodates second knives 30 designed according to the invention and which are moved toward the support strip 12 fixed on the sieve 9. A further corresponding second support strip, which accommodates second knives and is not shown in the representation and the knives of which are designed as mirror images of the second knives 26 assigned to the second support strip 25, which is shown, is located on the opposite side of the housing 22. As shown in FIGS. 1 and 2, the suction device 23 is guided on the tube 19 via the roller pairs 20 and 21 in the manner of a carriage. The suction device 23 thereby suctions up the contaminants located on the surface of the sieve 9 and conveys these into the separating device 27.

If plant components, such as corn husks, short straw, etc., are located on the inlet-side surface of the sieve 9, as shown in FIG. 3, this material is cut up by the first and second knives 13 and 30 during the movement of the second support strip 29 relative to the first outer support strip 12 and received by the suction device 23 and conveyed into the separating device 27. The two-edged knives 15 of the knife strips 14 disposed in the center of the sieve 9 implement a pushing cut due to the face-side placement of the knife-edges thereof. Therefore, the components that may have been carried along by the second knives 30 are further cut and torn up and then, in this state, reach the suction region of the suction device 23.

Reference is made to FIGS. 4 and 5 with respect to the embodiment of the first knives 13 disposed on the outer support strips 12. FIG. 4 shows the corresponding support strip 12 having the first knives 13, in a perspective view. A plurality of fastening bores 31 is provided in the support strip 13, by which the support strip 12 is fixed on the sieve 9. As shown in FIG. 5, which shows one of the first knives 13 in an enlarged view as compared to FIG. 4, knife 13 comprises a knife-edge 32, which extends at a slant, i.e., the knife-edge 32 rises in the direction of motion, proceeding from the support strip 12, until a peak 33 is reached, which results in a pulling cut.

FIG. 6 also shows, in a perspective view, the second support strip 29. The second support strip 29 is fixed on the housing 22 of the suction device 23 by retaining eyes 34. The second knives 30 fastened to this second support strip 29 have a diagonally extending knife-edge 35, which as shown in FIG. 7, is oriented in the direction of motion of the housing and which rises from the support strip 29 to a peak 36. A pulling cut also is implemented by the angle of cut thereof. The interacting first and second knives 13 and 30 cut up the leaf or stalk material in such a manner that no residue thereof accumulates in the region of the vertical frame parts, in which a reversal of the direction of motion of the suction device 23 takes place. Instead, substantially all contaminants are advantageously removed from the inlet-side surface of the sieve 9 using a reliable process, thereby ensuring that a sufficient quantity of cooling air is continuously supplied to the heat exchanger 8.

LIST OF REFERENCE CHARACTERS 1 self-propelled harvesting attachment
2 front harvesting attachment
3 upper discharge chute
4 discharge flap
5 covering element
6 air intake system for cooling air
7 receiving housing
8 heat exchanger
9 sieve
10 vertical frame part
11 horizontal frame parts
12 outer support strips
13 first knife
14 knife strips
15 two-edged knife
16 support
17 cross brace
18 linear guidance system
19 tube
20 roller pair
21 roller pair
22 housing
23 suction device
24 connector
25 suction pipe
26 suction blower
27 separating device
28 cover plate
29 second support strip
30 second knife
31 fastening bore
32 slanted knife-edge of 13
33 peak of first knife 13
34 retaining eyes
35 diagonally extending knife-edge of 30
36 peak of second knife 30

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An air intake system for cooling air, which is fed to at least one heat exchanger, cooling surfaces of assemblies of a self-propelled harvesting machine or both, the air intake system comprising:
   a sieve through which the cooling air flows and which is equipped, on an inlet-side, with a device for removing and shredding components of the cooling air adhering on an inlet-side surface of the sieve,
   wherein the device comprises a suction device and a cutting device;
   wherein the cutting device is formed of comb-like elements on a surface of the sieve and on a surface section of the suction device facing the inlet-side surface of the sieve or, the cutting device is formed of a front element connected to a surface section of the suction device;
   wherein the comb-like elements disposed on the surface of the sieve are designed as knives and disposed on support or knife strips oriented transversely thereto;
   wherein at least one of the support strips is equipped with first knives, the knife-edges of which implement a pulling cut;
   wherein the comb-like elements on both end faces of the suction device or of the front element attached thereto are designed as second knives, the knife-edges of which implement a pulling cut; and
   wherein the first knives provided on the sieve comprise first knife-edges, which rise relative to a plane of the surface of the sieve from a front end, as viewed in the direction of movement, diagonally in the direction of a back end, continuously.

2. The air intake system for cooling air according to claim 1, wherein the first knives provided on the sieve comprise first knife-edges, which rise relative to a plane of the surface of the sieve from a front end, as viewed in the direction of movement, in a curved manner.

3. The air intake system for cooling according to claim 2, wherein the curved manner in which the knife edges rise is hyperbolic.

4. The air intake system for cooling air according to claim 1, wherein the sieve and the suction device are moved in two directions of motion relative to one another and wherein the first knife-edges in both directions of motion rise to a peak in a diagonal or hyperbolic manner.

5. The air intake system for cooling air according to claim 1, wherein the second knives, which are disposed at least indirectly at the suction device and extend in the direction of the surface of the sieve, comprise second knife-edges, and wherein the second knife edges extend from the receptacles thereof diagonally toward the rear in the direction of motion.

6. The air intake system for cooling air according to claim 5, wherein the second knives, which are disposed at least indirectly at the suction device and extend in the direction of the surface of the sieve, comprise second knife-edges and wherein the second knife edges extend from the receptacles thereof hyperbolically toward the rear in the direction of motion.

7. The air intake system for cooling air according to claim 1, wherein the sieve is rectangular and is accommodated by frame parts of the receiving housing or the heat exchanger and wherein the suction device is guided relative to the sieve via a housing designed as a carriage, by means of a linear guidance system.

8. The air intake system for cooling air according to claim 7, wherein only those outer support strips disposed close to the particular end regions of the surface of the sieve passed over by the suction device are equipped with first knives and wherein knife-edges of the first knives implement a pulling cut.

9. The air intake system for cooling air according to claim 8, wherein at least one knife strip having knives is provided in the region of a center of the surface of the sieve and wherein these knives have knife-edges on both end faces.

10. The air intake system for cooling air according to claim 7, wherein the suction device implements a horizontal motion relative to the sieve.

11. The air intake system for cooling air according to claim 7, wherein the linear guidance system is formed by a rail disposed between frame parts of the receiving housing, which extend parallel to one another, and by guide rollers, which are rotatably supported at least indirectly on a housing of the suction device.

12. The air intake system for cooling air according to claim 11, wherein the rail is designed as a tube and wherein the guide rollers have a jacket surface adapted to the radius of curvature of the tube.

13. The air intake system for cooling air according to claim 1, wherein the first knives are fixed on the sieve by a plurality of support strips and wherein the support strips extend parallel to one another and are separated from one another.

14. The air intake system for cooling air according to claim 1, wherein a cover plate is connected to a housing of the suction device and covers the sieve on the outlet-side surface thereof, opposite the suction device.

15. The air intake system for cooling air according to claim 1, wherein the suction device is connected via a suction pipe to a suction blower and wherein a separating device is assigned to the suction blower.

* * * * *